United States Patent
Galligan et al.

(10) Patent No.: US 9,166,864 B1
(45) Date of Patent: Oct. 20, 2015

(54) ADAPTIVE STREAMING FOR LEGACY MEDIA FRAMEWORKS

(75) Inventors: Francis Galligan, San Jose, CA (US); Aaron James Colwell, Seattle, WA (US)

(73) Assignee: Google Inc., Mountain View, CA (US)

( * ) Notice: Subject to any disclaimer, the term of this patent is extended or adjusted under 35 U.S.C. 154(b) by 96 days.

(21) Appl. No.: 13/545,799

(22) Filed: Jul. 10, 2012

Related U.S. Application Data

(60) Provisional application No. 61/588,143, filed on Jan. 18, 2012.

(51) Int. Cl.
H04L 29/06 (2006.01)

(52) U.S. Cl.
CPC ..... *H04L 29/06176* (2013.01); *H04L 29/06462* (2013.01)

(58) Field of Classification Search
CPC .................. H04L 29/06027; H04L 29/06462; H04L 29/06095
USPC ........................................................ 709/231
See application file for complete search history.

(56) References Cited

U.S. PATENT DOCUMENTS

| | | | |
|---|---|---|---|
| 7,743,161 B2 | 6/2010 | Dey et al. | |
| 2004/0125877 A1 | 7/2004 | Chang et al. | |
| 2009/0234938 A1* | 9/2009 | Amsterdam et al. | 709/221 |
| 2009/0254657 A1* | 10/2009 | Melnyk et al. | 709/224 |
| 2010/0158101 A1* | 6/2010 | Wu et al. | 375/240.01 |
| 2011/0023076 A1* | 1/2011 | Park et al. | 725/116 |
| 2011/0268178 A1* | 11/2011 | Park et al. | 375/240.02 |

OTHER PUBLICATIONS

Watson, Mark, "Adaptive HTTP streaming and HTML5," W3C Web and TV Workshop, Feb. 8-9, 2011, 6 pages, http://www.w3.org/2010/11/web-and-tv/papers/webtv2_submission_62.pdf, Last accessed Jul. 12, 2012.

Gannes, Liz, "The Lowdown on Apple's HTTP Adaptive Bitrate Streaming," http://gigaom.com/video/the-lowdown-on-apples-http-adaptive-bitrate-streaming/, Last accessed Jul. 12, 2012.

"Smooth Streaming," http://www.iis.net/download/smoothstreaming, Last accessed Jul. 12, 2012.

Akhshabi, et al., "An Experimental Evaluation of Rate-Adaptation Algorithms in Adaptive Streaming over HTTP," 12 pages, http://www.cc.gatech.edu/~sakhshab/Saamer_MMSys11.pdf, Last accessed Jul. 12, 2012.

(Continued)

*Primary Examiner* — Vivek Srivastava
*Assistant Examiner* — Hermon Asres
(74) *Attorney, Agent, or Firm* — Amin, Turocy & Watson, LLP

(57) ABSTRACT

This disclosure relates to adaptive streaming for legacy media frameworks. A streaming component includes a reception component that receives a first set of header data associated with an audio stream, and a second set of header data associated with a video stream. A parsing component synthesizes a third set of header data using the first set of header data and the second set of header data based on a set of header criteria for a legacy media framework, and provides the third set of header data to the legacy media framework. A download component acquires respective sets of data from the audio stream and the video stream, and an adaption component provides sets of data to the legacy media framework based on a set of streaming criteria for the legacy media framework.

17 Claims, 12 Drawing Sheets

(56) References Cited

OTHER PUBLICATIONS

Ozer, Jan, "How to: Encoding for Adaptive Streaming," Video in "How to Encode for Adaptive Streaming" posted by Troy Dreier, Jun. 10, 2011, http://www.streamingmedia.com/Articles/Editorial/Featured-Articles/How-to-Encode-for-Adaptive-Streaming-75981.aspx, Last accessed Jul. 12, 2012.

Digital Rapids, "Improving the Internet TV and Mobile Video Experience," White paper, 2010, 5 pages, http://www.screenplaysmag.com/wp-content/uploads/2011/06/Digital-Rapids-AdaptiveStreamingWP.pdf, Last accessed Jul. 12, 2012.

Romero, Luciano Rubio, "A Dynamic Adaptive HTTP Streaming Video Service for Google Android," Oct. 6, 2011, 148 pages, http://web.it.kth.se/~maguire/DEGREE-PROJECT-REPORTS/111006-Luciano-Rubio-with-cover.pdf, Last accessed Jul. 12, 2012.

* cited by examiner

ADAPTIVE STREAMING FOR LEGACY MEDIA FRAMEWORKS

CROSS-REFERENCE TO RELATED APPLICATIONS

This application claims the benefit of U.S. Provisional Application No. 61/588,143, filed Jan. 18, 2012 and entitled ADAPTIVE STREAMING FOR LEGACY MEDIA FRAMEWORKS, the entirety of which is incorporated herein by reference.

TECHNICAL FIELD

This disclosure generally relates to systems and methods that facilitate adaptive streaming for legacy media frameworks.

BACKGROUND

The internet and media enabled portable computing devices have dramatically altered the processes for generating and consuming media content. Presently, users can consume media content virtually anywhere at any time, as long as they have access to a media capable device with an internet connection. The convenience of being able to view media content via the internet, essentially on demand, has resulted in explosive growth of internet media consumption.

Streaming is a common method of media delivery across the internet. Streaming media is continuously received and presented to an end-user while being delivered by a streaming provider. Streaming enables media that includes large amounts of data to be displayed on a client device prior to the entire media file being transmitted. Internet media traffic is currently approaching a majority of consumer internet traffic, and the rate of demand is projected to continue increasing. In particular, streaming media is expected to account for a large portion of the projected increase in demand.

Typically, streaming media content is a computationally expensive process that involves substantial bandwidth and quantities of resources from a client device. Designers are constantly trying to develop newer and more efficient techniques for streaming multimedia content to client devices. However, media frameworks that manage execution and consumption of media content may be incompatible with newer techniques for streaming media content.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for adaptive streaming for legacy media frameworks are disclosed. A streaming component includes a reception component that receives a first set of header data associated with an audio stream, and a second set of header data associated with a video stream. A parsing component synthesizes a third set of header data using the first set of header data and the second set of header data based on a set of header criteria for a legacy media framework, and provides the third set of header data to the legacy media framework. A download component acquires respective sets of data from the audio stream and the video stream, and an adaption component provides sets of data to the legacy media framework based on a set of streaming criteria for the legacy media framework.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
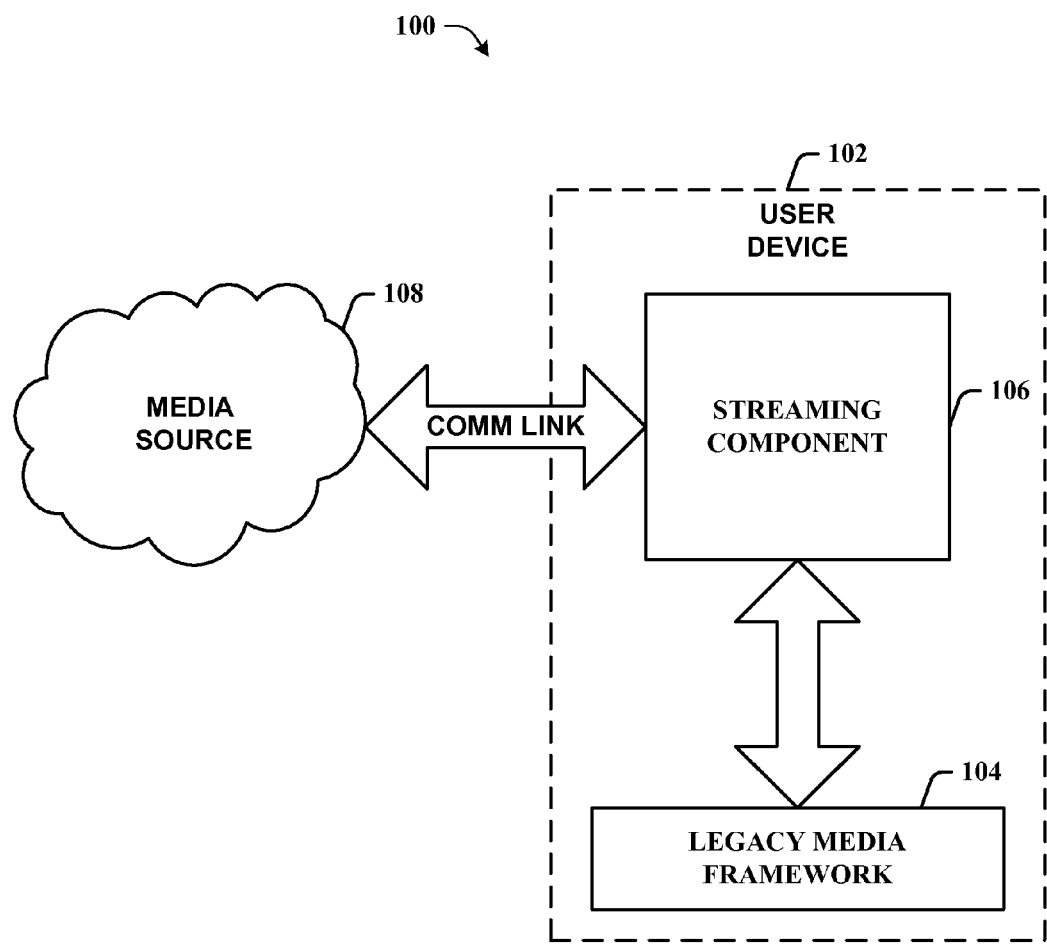
FIG. 1 illustrates an example system for adaptive streaming for legacy media frameworks in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Techniques for streaming media content can typically involve computationally expensive processes. Designers are continually working to develop newer and more efficient techniques. However, media frameworks that manage execution and consumption of media content on devices may be incompatible with newer techniques for streaming media content. One non-limiting implementation of the innovation provides for efficient adaptive streaming for legacy media frameworks.

More particularly, in accordance with an embodiment a reception component receives a first set of header data associated with an audio stream, and a second set of header data associated with a video stream, a parsing component synthesizes a third set of header data using the first set of header data and the second set of header data based on a set of header criteria, a header component provides the third set of header data to a media framework, a download component acquires respective sets of data from the audio stream and the video stream, and an adaption component provides sets of data to the media framework based on a set of streaming criteria.

Non-Limiting Examples of Systems for Adaptive Streaming for Legacy Media Frameworks Turning now to FIG. 1, illustrated is an example system 100 for adaptive streaming for legacy media frameworks in accordance with various aspects described in this disclosure. Generally, system 100 can include a memory that stores computer executable components and a processor that executes computer executable components stored in the memory, examples of which can be found with reference to FIG. 12. System 100 includes a user device 102. The user device 102 can include but is not limited to a smart phone, a cell phone, a personal digital assistant (PDA), a tablet, a laptop, a desktop computer, a portable music player, a video game system, an electronic reader (e-reader), a global positioning system (GPS) transceiver, a set-top box, and/or a television. The user device 102 includes a legacy media framework 104, and a streaming component 106.

The legacy media framework 104 processes, executes, or otherwise manages consumption of one or more media formats for the user device 102. For example, in one implementation, the legacy media framework 104 captures, plays, and/or transcodes time-based media, for instance, audio and/or video. The media can be streamed from a media source 108 that includes but is not limited to a content server or set of content servers. Video streamed from the media source 108 includes video data (e.g., frames, stacks of image data, etc.) and audio data. The media source 108 may employ any of a plurality of techniques for streaming video. For example, in one implementation, the media source 108 provides a first stream for video data (e.g., stacks of image data, frames, etc.), and a second stream for audio data. The legacy media framework 104 may not be adapted to process media streamed from the media source 108. For instance, the legacy media framework 104 may be adapted to process streaming video having a combined (e.g., interleaved, multiplexed, etc.) video stream and audio stream, and may be unable to process media streamed via the media source 108 using separate streams for video data and audio data.

The streaming component 106 facilitates processing, by the legacy media framework, of media streamed from the media source 108. The streaming component 106 adapts, translates, or otherwise converts data provided by the media source 108 based on a set of streaming criteria for the legacy media framework 104. The streaming component 106 may be implemented as an application, or part of an application, on a client device (e.g., the user device 102). For example, the streaming component may be implemented as part of a mobile application or a browser application installed on the user device. In one implementation, the streaming component 106 obtains, acquires, or otherwise receives a first stream for video data (e.g., video stream) associated with video, and a second stream for audio data (e.g., audio stream) associated with video from the media source 108. The streaming component 106 converts the first stream and second stream into a third stream having a format that the legacy media framework 104 is adapted to process. Aspects of the innovation are not limited to a particular quantity of streams for video data and/or audio data. For example, in one implementation, the streaming component 106 can receive a set of Y streams for the audio data, and a set of X streams for the video data, where X and Y are integers (discussed in greater detail with reference to FIG. 7). As an additional or alternative example, in one implementation, the streaming component 106 can receive a single demuxed stream for audio data and video data (e.g., demuxed a/v file) (discussed in greater detail with reference to FIG. 8). It is to be appreciated that although the streaming component 106 is illustrated as being included in the user device 102, such implementation is not so limited. For example, the streaming component 106 can be included in the media source 108, and/or can be a stand-alone component.

Figure 2:
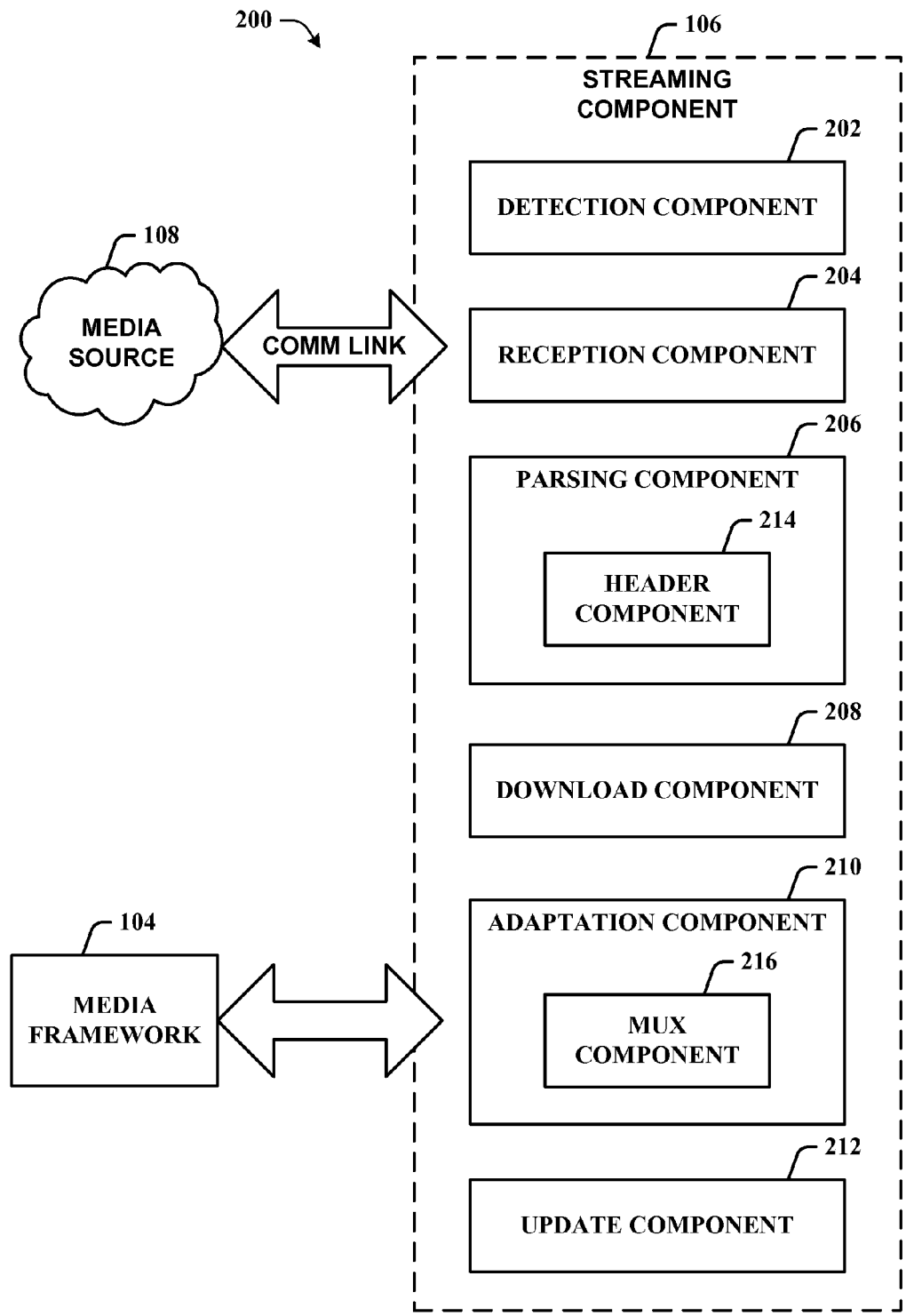
FIG. 2 illustrates an example streaming component in accordance with various aspects described in this disclosure.

FIG. 2 illustrates an example streaming component 106 in accordance with various aspects described in this disclosure. As discussed, the streaming component 106 facilitates processing of media streamed using a media source 108 by a legacy media framework 104. The streaming component 106 in FIG. 2 includes a detection component 202, a reception component 204, a parsing component 206, a download component 208, an adaptation component 210, and an update component 212. The components are communicatively coupled so as to enable the following. The detection component 202 determines, identifies, or otherwise detects a set of streaming criteria and/or an associated set of header criteria for the legacy media framework 104. The streaming criteria can include but is not limited to a media file specification, and/or a format that the legacy media framework 104 is adapted to process. For example, in one implementation, the detection component 202 detects that the legacy media framework 104 is adapted to process streaming video having combined audio and video streams. In addition, the streaming criteria can include, or be associated with, a set of header criteria. The header criteria can include but is not limited to a structure of header data that the legacy media framework 104 is adapted to process.

The reception component 204 obtains, acquires, or otherwise receives header data associated with media streams from the media source 108. For example, in one implementation, the reception component receives, from the media source 108, a first set of header data associated with an audio stream for audio data or an audio file associated with a streaming video, and a second set of header data associated with a video stream for video data or a video file associated with the streaming video. For instance, the sets of header data can be included in manifests associated with the respective streams, such as may be implemented in an adaptive streaming system.

The parsing component 206 examines, inspects, or otherwise parses received header data. In addition, the parsing component 206 generates, creates, or otherwise synthesizes sets of header data, based on the set of streaming criteria, using the received header data. For example, in one implementation, the parsing component 206 parses the first set of header data associated with the audio stream, and the second set of header data associated with the video stream, and synthesizes a third set that provides for a combination of the audio stream and video stream, when the streaming criteria indicates that the legacy framework is adapted to process streaming video having combined audio and video streams. The parsing component 206 includes a header component 214. The header component 214 sends, forwards, or otherwise provides the synthesized header data to the legacy media framework 104. For example, in one implementation, the header component 214 provides the synthesized header data to the legacy media framework 104 based on the set of header criteria for the legacy media framework 104. The header criteria can include but is not limited to a format and/or a packet size for header data that the legacy media framework 104 is adapted to process.

The download component 208 receives, obtains, or otherwise acquires respective sets of data from media streams. For example, in one implementation, the download component acquires sets of data (e.g., chunks) from an audio stream, and sets of data from a video stream, where the media source 108 provides separate streams for audio data and video data. For instance, the download component 208 can acquire the respective chunks of data based on information included in the respective manifests associated with a stream. The information included in the manifests can include but is not limited to information regarding locations, sizes, and/or key frames for respective chunks. The chunks may have been encoded at various bitrates and may be of various sizes.

The adaptation component 210 provides subsets of the respective sets of data to the legacy media framework 104 based on the set of streaming criteria. For example, in one implementation, the adaptation component 210 provides the respective chunks of data from the audio stream and video stream, respectively, to the legacy media framework 104 based on the set of streaming criteria (discussed in greater detail with regard to FIG. 6). As an additional or alternative example, in one implementation, the adaptation component 210 includes a mux component 216 that interleaves data from the audio stream and video stream based on the set of streaming criteria (discussed in greater detail with regard to FIG. 5). It is to be appreciated that although the mux component 216 is illustrated as being included in the streaming component 106, such implementation is not so limited. For example, in one implementation, the mux component 216 can be a standalone component communicatively coupled to the legacy media framework 104 so as to enable the mux component 216 to act as an adapting proxy.

The update component 212 modifies, alters, or otherwise updates mechanisms or data that distinguish streams from one another. For example, media files typically have mechanisms to distinguish streams from one another in media files. This mechanism may be, or include, a stream identifier, e.g., Stream ID. In one implementation, the update component 212 modifies a stream identifier included in, or associated with, the headers and/or sets of data before providing the headers and/or sets of data to the legacy media framework 104. As discussed, aspects of the innovation are not limited to a particular quantity of streams for video data and/or audio data. For example, in one implementation, the streaming component 106 can convert a set Y of streams for the audio file or audio data, and a set X of streams for the video file or video data, where X and Y are integers, based on the set of streaming criteria (discussed in greater detail with reference to FIG. 7). As an additional or alternative example, in one implementation, the streaming component 106 can convert a single demuxed stream for audio data and video data (e.g., demuxed a/v file) based on the set of streaming criteria (discussed in greater detail with reference to FIG. 8).

Figure 3:
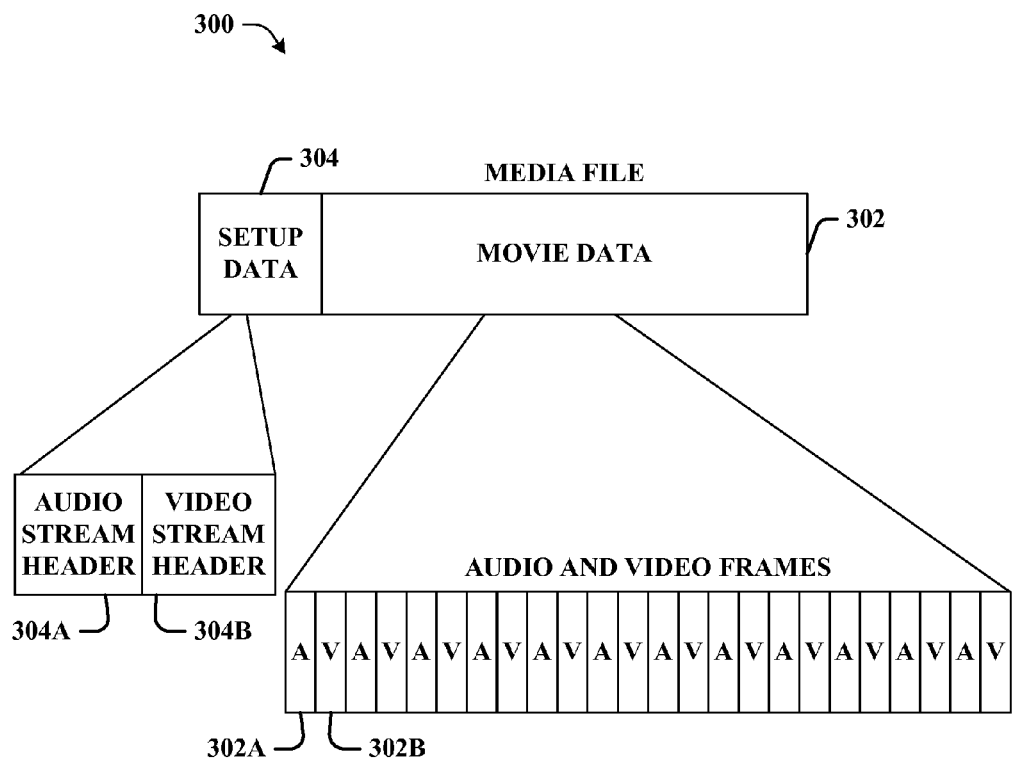
FIG. 3 illustrates a system that provides a non-limiting example of streaming media in accordance with various aspects described in this disclosure.

Turning to FIG. 3, illustrated is a system 300 that provides a non-limiting example of streaming media in accordance with various aspects described in the disclosure. As discussed, a legacy media framework 104 is adapted to process streaming media based on a set of streaming criteria. For example, in one implementation, the legacy media framework 104 is adapted to process movie data 302 (e.g., streaming video) having interleaved audio data 302A and video data 302B (e.g., frames, stacks of image data, etc.). The streaming criteria can include, or be associated with, a set of header criteria. For example, in one implementation, the set of header criteria includes a structure of setup data 304 (e.g., header data) that the legacy media framework 104 is adapted to process. For instance, the legacy media framework 104 can be adapted to process setup data 304 for the movie data 302 that includes header data 304A (audio stream header) for audio data 302A included in the movie data 302, and header data 304B (video stream header) for video data 302B also included in the movie data 302.

Figure 4:
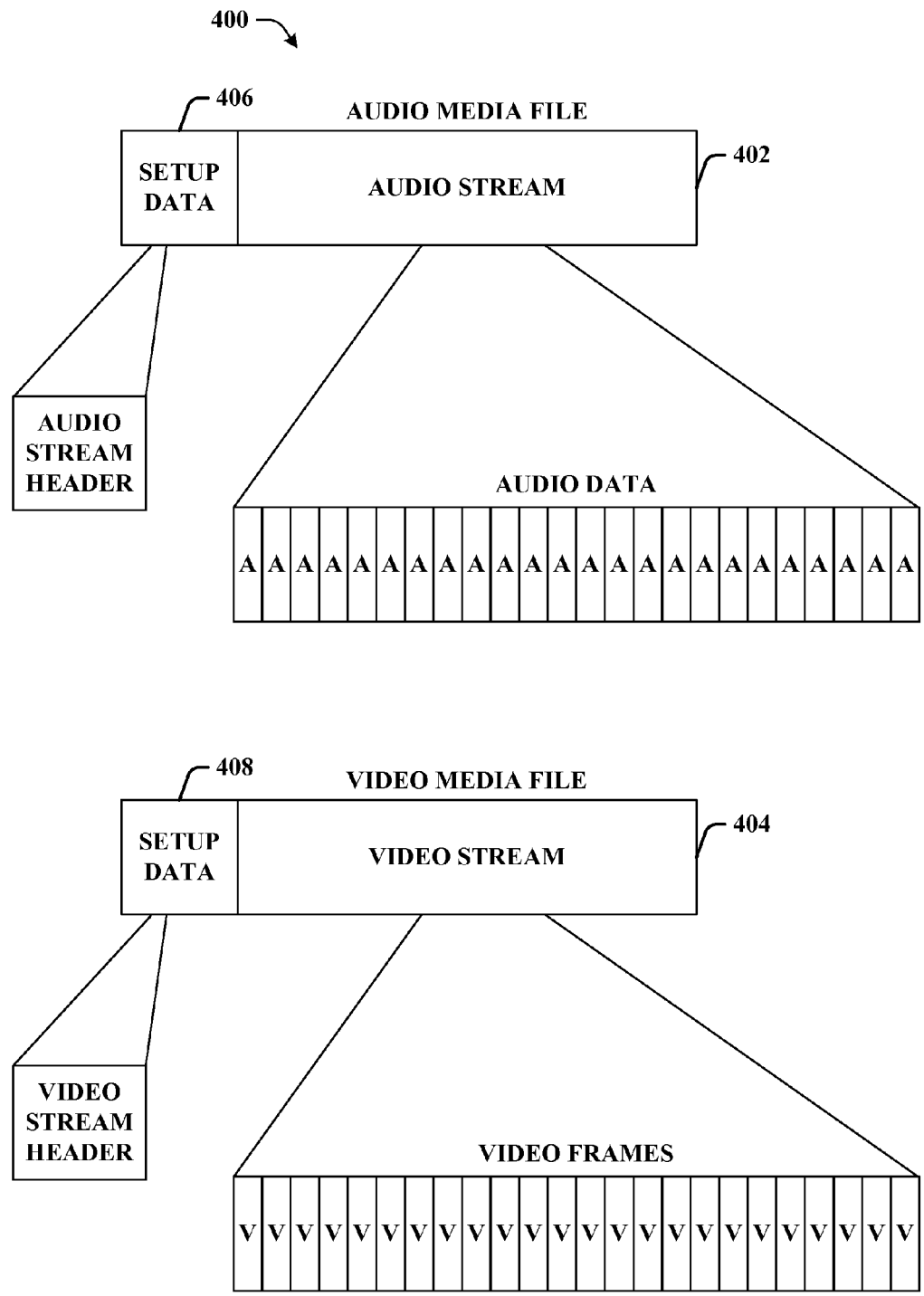
FIG. 4 illustrates a system that provides a non-limiting example of streaming media in accordance with various aspects described in this disclosure.

FIG. 4 illustrates a system 400 that provides a non-limiting example of streaming media in accordance with various aspects described in the disclosure. As discussed, a media source 108 may employ any of a plurality of techniques for streaming media. For example, in one implementation, the media source can provide a first stream for an audio file or audio data (audio stream 402) associated with movie data, and a second stream for a video file or video data (video stream 404) associated with the movie data. In this example, the media source 108 provides a first set of header data 406 (e.g., audio stream header) for the audio stream, and a second set of header data 408 for the video stream (e.g., video stream header). It is to be appreciated that a media framework (e.g., legacy media framework 104) adapted to process streaming media having combined (e.g., interleaved, multiplexed, etc.) video and audio data may be unable to process separate video and audio streams.

Figure 5:
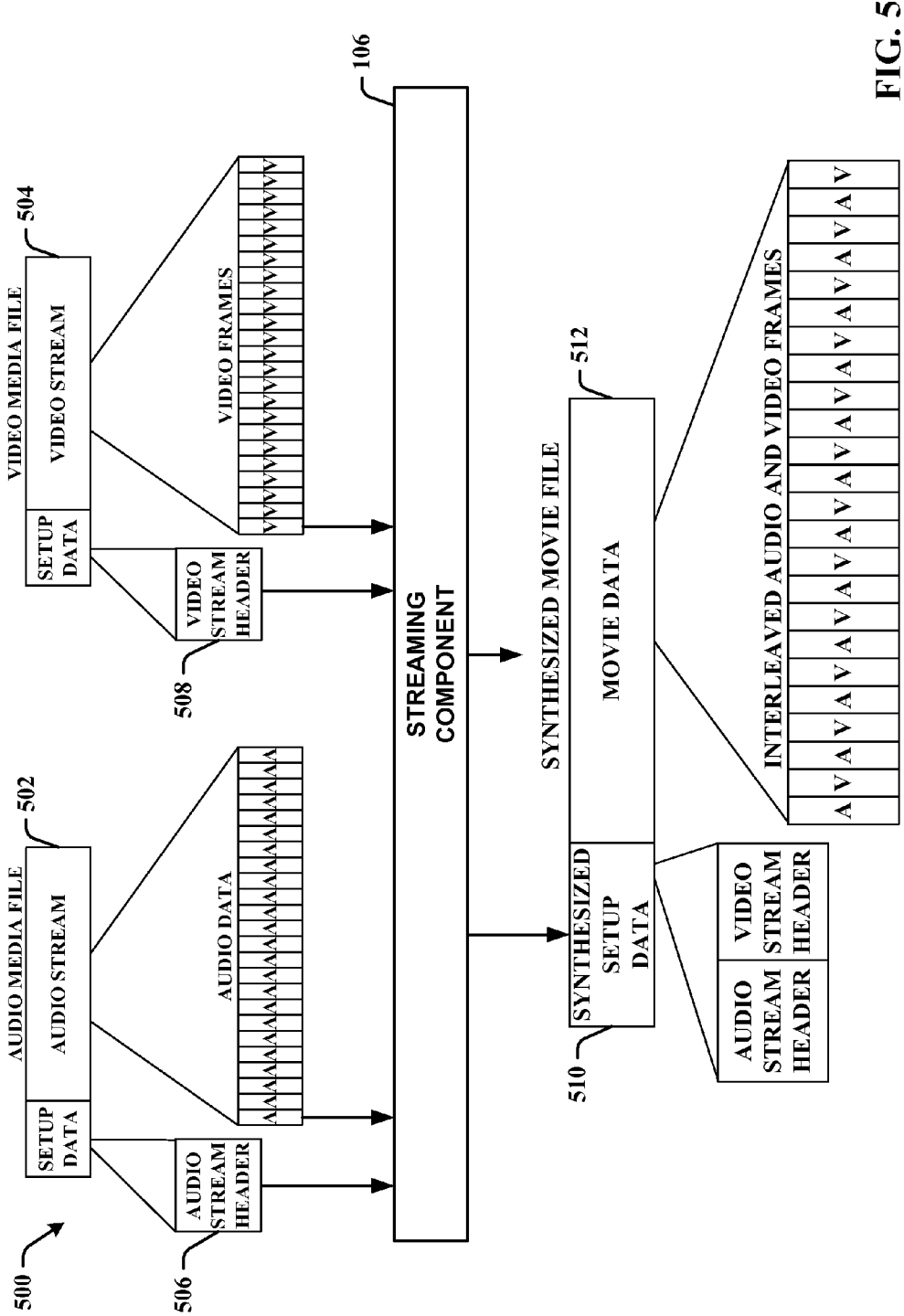
FIGS. 5-8 illustrate example systems for adaptive streaming for legacy media frameworks in accordance with various aspects described in this disclosure.

FIG. 5 illustrates an example system 500 for adaptive streaming for legacy media frameworks in accordance with various aspects described in this disclosure. The system 500 includes a streaming component 106. As discussed above, the streaming component 106 facilitates processing of streaming media by a legacy media framework (e.g., legacy media framework 104) based on a set of streaming criteria. The set of streaming criteria can include but is not limited to a media file specification, and/or a format of streaming media that the legacy media framework is adapted to process. In addition, the set of streaming criteria can include, or be associated with, a set of header criteria. For example, in one implementation, the set of streaming criteria defines, details, or otherwise specifies a format of streaming video that includes combined audio and video streams, and a format for a set of header data that includes combined header data for the audio and video streams.

In one implementation, a media source (e.g., a media source 108) provides a first stream for an audio file or audio data (audio stream 502) associated with movie data (e.g., streaming video), and a second stream for a video file or video data (video stream 504) associated with the movie data. A first set of header data 506 (e.g., audio stream header) is associated with the audio stream 502, and a second set of header data 508 (e.g., video stream header) is associated with the video stream 504. It is to be appreciated that a legacy media framework adapted to process streaming media having combined (e.g., interleaved, multiplexed, etc.) video and audio streams may be unable to process separate video and audio streams.

The streaming component 106 obtains, acquires, or otherwise receives the first set of header data 506 associated with the audio stream 502, and the second set of header data 508 associated with the video stream 504. For example, in one embodiment, the first set of header data 506 and the second set of header data 508 can be included in respective manifests for the audio stream 502 and video stream 504. The streaming component 106 synthesizes a third set of header data 510 (e.g., synthesized set of header data) using the received header data based on the set of header criteria. The third set of header data 510 includes combined data regarding audio data from the audio stream 502, and video data from the video stream 504.

In addition, the streaming component 106 acquires sets of data from the audio stream 502, and sets of data from the video stream 504. For example, in one embodiment, the streaming component 106 can acquire the respective sets of data based on information included in the manifests. The information included in the manifests can include but is not limited to information regarding locations, sizes, and/or key frames for the respective sets of data. The streaming component 106 interleaves data from the audio stream 502 and video stream 504 based at least in part on the set of streaming criteria, and generates a synthesized set of movie data 512 (e.g., streaming video). The synthesized set of movie data 512 can be provided to the legacy media framework (discussed in greater detail with reference to FIGS. 1 and 2). For instance, the legacy media framework may be adapted to process the third set of header data 510, and the synthesized movie data 512.

Figure 6:
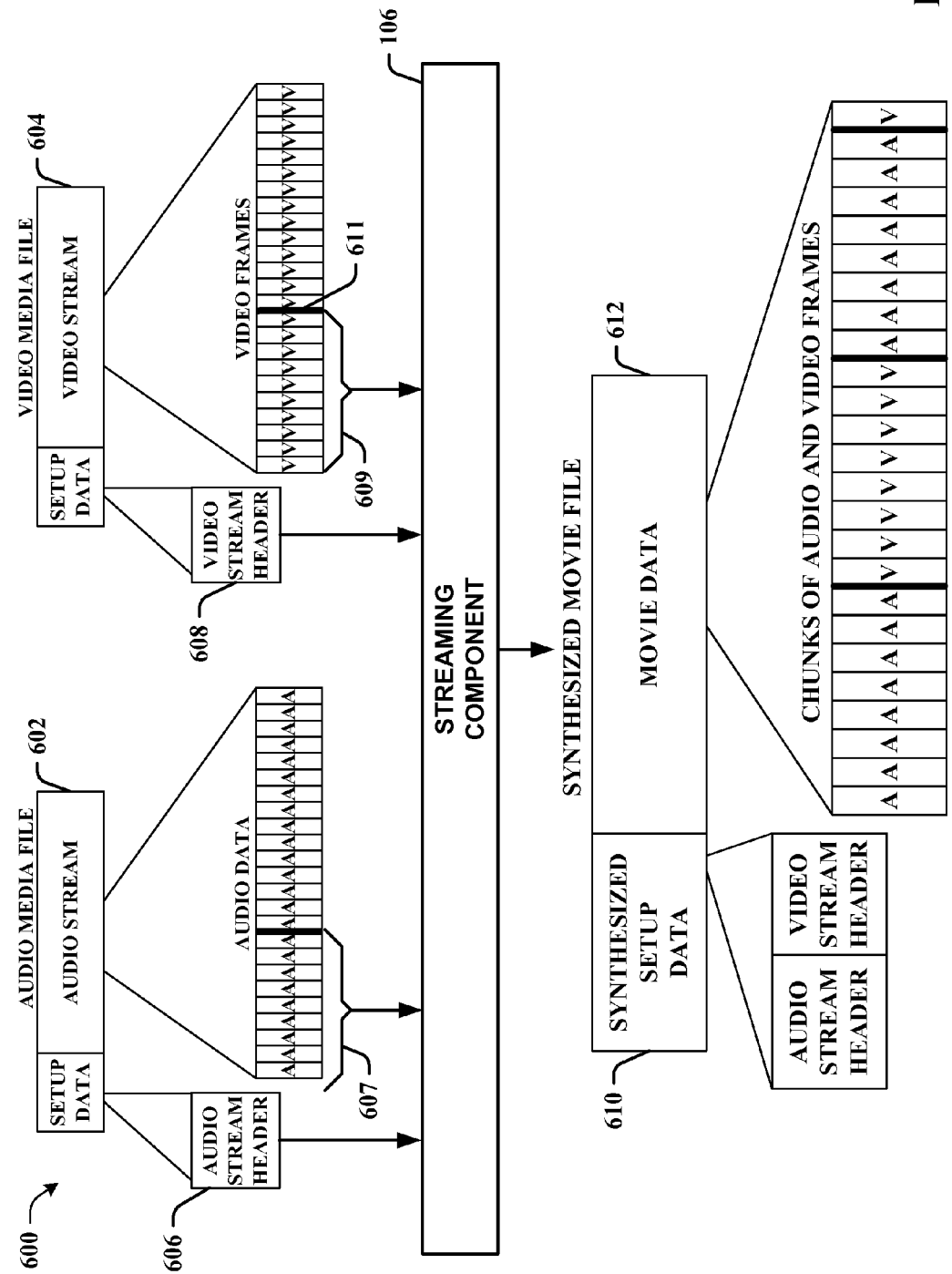

FIG. 6 illustrates an example system 600 for adaptive streaming for legacy media frameworks in accordance with various aspects described in this disclosure. The system 600 includes a streaming component 106. As discussed, the streaming component 106 facilitates processing of streaming media by a legacy media framework (e.g., legacy media framework 104) based on a set of streaming criteria. The set of streaming criteria can include but is not limited to a media file specification, and/or a format of streaming media that the legacy media framework is adapted to process. In addition, the set of streaming criteria can include, or be associated with, a set of header criteria. For example, in one implementation, the set of streaming criteria defines, details, or otherwise specifies a format of streaming video that includes combined chunks of data from an audio and video stream, and a format for a set of header data that includes combined header data for the audio and video streams.

In one implementation, a media source (e.g., a media source 108) provides a first stream for an audio file or audio data (audio stream 602) associated with movie data (e.g., streaming video), and a second stream for a video file or video data (video stream 604) associated with the movie data. A first set of header data 606 (e.g., audio stream header) is associated with the audio stream 602, and a second set of header data 608 is associated with the video stream 604. It is to be appreciated that a legacy media framework adapted to process streaming media including chunks of data from the video and audio stream may be unable to process separate video and audio streams.

The streaming component 106 obtains, acquires, or otherwise receives the first set of header data 606 associated with the audio stream 602, and the second set of header data 608 associated with the video stream 604 (e.g., from an HTTP web server). For example, in one embodiment, the header data 606 and header data 608 can be included in respective manifests for the audio stream 502 and video stream 504, such as may be implemented in an HTTP adaptive streaming system. The streaming component 106 synthesizes a third set of header data 610 (e.g., synthesized set of header data) using the received header data based on the set of header criteria. The third set of header data 610 includes combined data regarding audio data from the audio stream 602, and video data from the video stream 604.

In addition, the streaming component 106 acquires chunks of data 607 from the audio stream 602, and chunks of data 609 from the video stream 604. For example, in one embodiment, the download component 208 can acquire respective chunks of data from the audio stream 602 and video stream 604 based on information included in the respective manifests. The chunks of data 609 from the video stream 604 may have been divided along Group of Pictures (GOP) boundaries such that each chunk begins with a key frame (e.g., key frame 611) so as to have no dependencies on past or future chunks. The information included in the manifests can include but is not limited to information regarding locations, sizes, and/or key frames for respective chunks. The chunks may have been encoded at multiple bitrates and may be of various sizes. For example, in one implementation, the streaming component 106 provides the full chunks of data to the legacy media framework without interleaving the data into a muxed data stream prior to sending the data to the legacy media framework. The legacy media framework is adapted to process the third set of header data 610, and the chunks of data.

It is to be appreciated, that the foregoing may be useful, for example, in a case where the legacy media framework expects multiplexed (muxed) data but can accept the separate streams of data in the form of cluster elements (e.g., chunks). In such a case, the client device (e.g., user device 102) can avoid expending resources interleaving the streams, and still provide the streamed data in a format that the legacy media framework is adapted to process.

Figure 7:
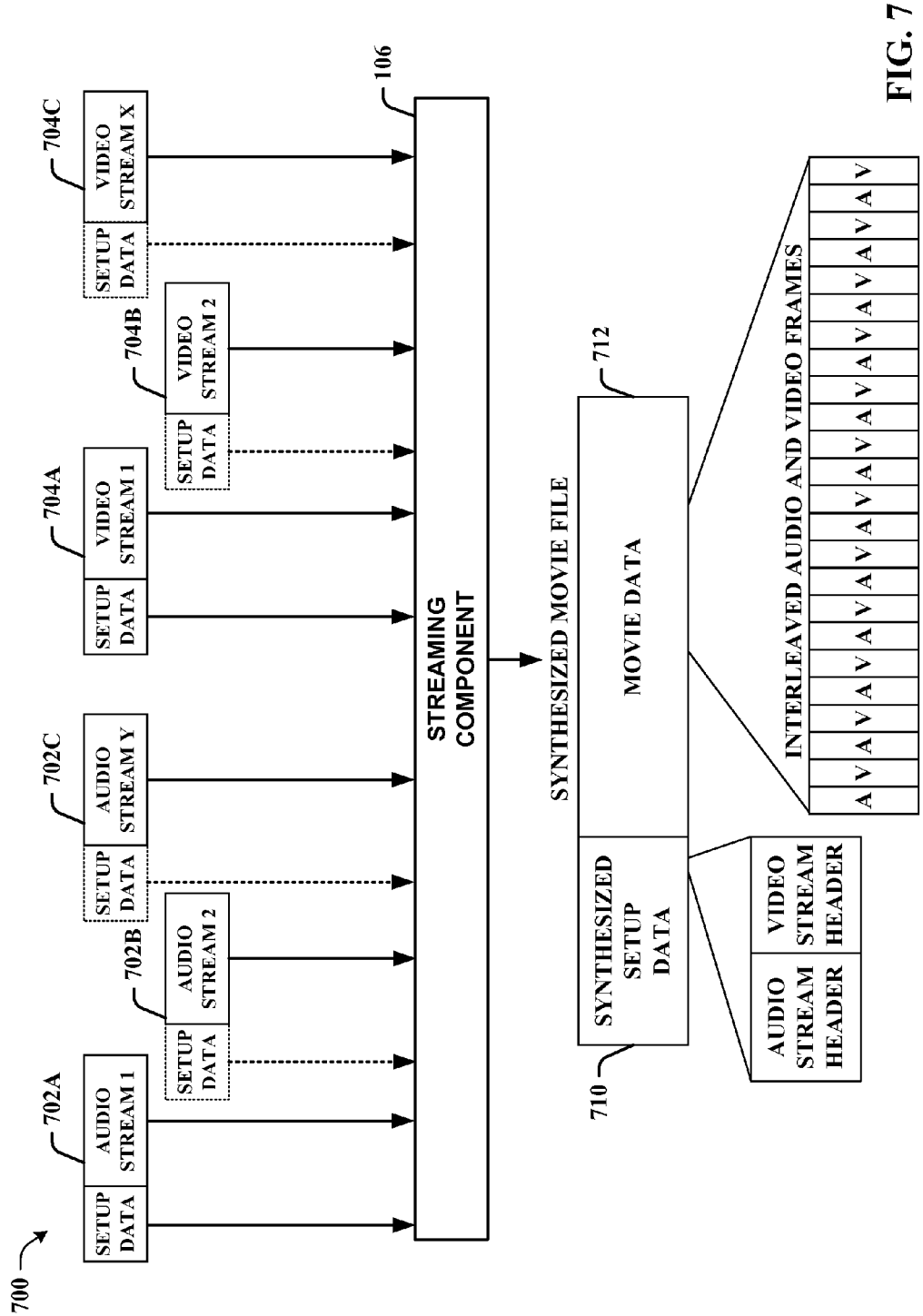

FIG. 7 illustrates an example system 700 for adaptive streaming for legacy media frameworks in accordance with various aspects described in this disclosure. The system 700 includes a streaming component 106. As discussed, the streaming component 106 facilitates processing of streaming media by a legacy media framework (e.g., legacy media framework 104) based on a set of streaming criteria. The set of streaming criteria can include but is not limited to a media file specification, and/or a format of streaming media that the legacy media framework is adapted to process. In addition, the set of streaming criteria can include, or be associated with, a set of header criteria. For example, in one implementation, the set of streaming criteria defines, details, or otherwise specifies a format of streaming video that includes combined audio and video streams, and a format for a set of header data that includes combined header data for the audio and video streams.

In one implementation, a media source (e.g., a media source 108) provides a set of streams 702 (e.g., 702A-C) for an audio file or audio data associated with movie data (e.g., streaming video), and a set of streams 704 (e.g., 704A-C) for a video file or video data associated with the movie data. It is to be appreciated that a legacy media framework adapted to process streaming media having combined (e.g., interleaved, multiplexed, etc.) video and audio streams may be unable to process separate video and audio streams. Aspects of the innovation are not limited to a particular quantity of streams for video data and/or audio data. For example, in one implementation, the set of streams 702 includes Y streams for the audio data associated with movie data, and the set of streams 704 includes X streams for the video data associated with the movie data, where X and Y are integers.

The streaming component 106 obtains, acquires, or otherwise receives header data associated with the audio streams 702, and header data associated with the video streams 704. For example, in one embodiment, the header data can be included in respective manifests for each of the audio streams 702A-C and video streams 704A-C. As an additional or alternative example, the header data can be included in respective manifests for a subset of the audio streams 702 and a subset of the video streams 704. For instance, the header data associated with the audio streams 702 can be included in a manifest for the audio stream 702A, and the header data associated with video streams 704 can be included in a manifest for the video stream 704A. The streaming component 106 synthesizes a synthesized set of header data 710 using the received header data based on the set of header criteria. The synthesized set of header data 710 includes combined data regarding audio data from the audio streams 702A-C, and video data from the video streams 704A-C. In addition, the streaming component 106 acquires sets of data from the audio streams 702A-C, and sets of data from the video streams 704A-C. For example, in one embodiment, the streaming component 106 can acquire the respective sets of data based on information included in the manifests. The information included in the manifests can include but is not limited to information regarding locations, sizes, and/or key frames for the respective sets of data.

The streaming component 106 interleaves data from the audio streams 702A-C and the video streams 704A-C based at least in part on the set of streaming criteria, and generates a synthesized set of movie data 712 (e.g., streaming video). The synthesized set of movie data 712 can be provided to the legacy media framework (discussed in greater detail with reference to FIGS. 1 and 2). For instance, the legacy media framework may be adapted to process the synthesized set of header data 710, and the synthesized movie data 712. As an additional or alternative example, in one implementation, the streaming component 106 provides the respective sets of data (e.g., chunks) to the legacy media framework without interleaving the respective the sets of data.

Figure 8:
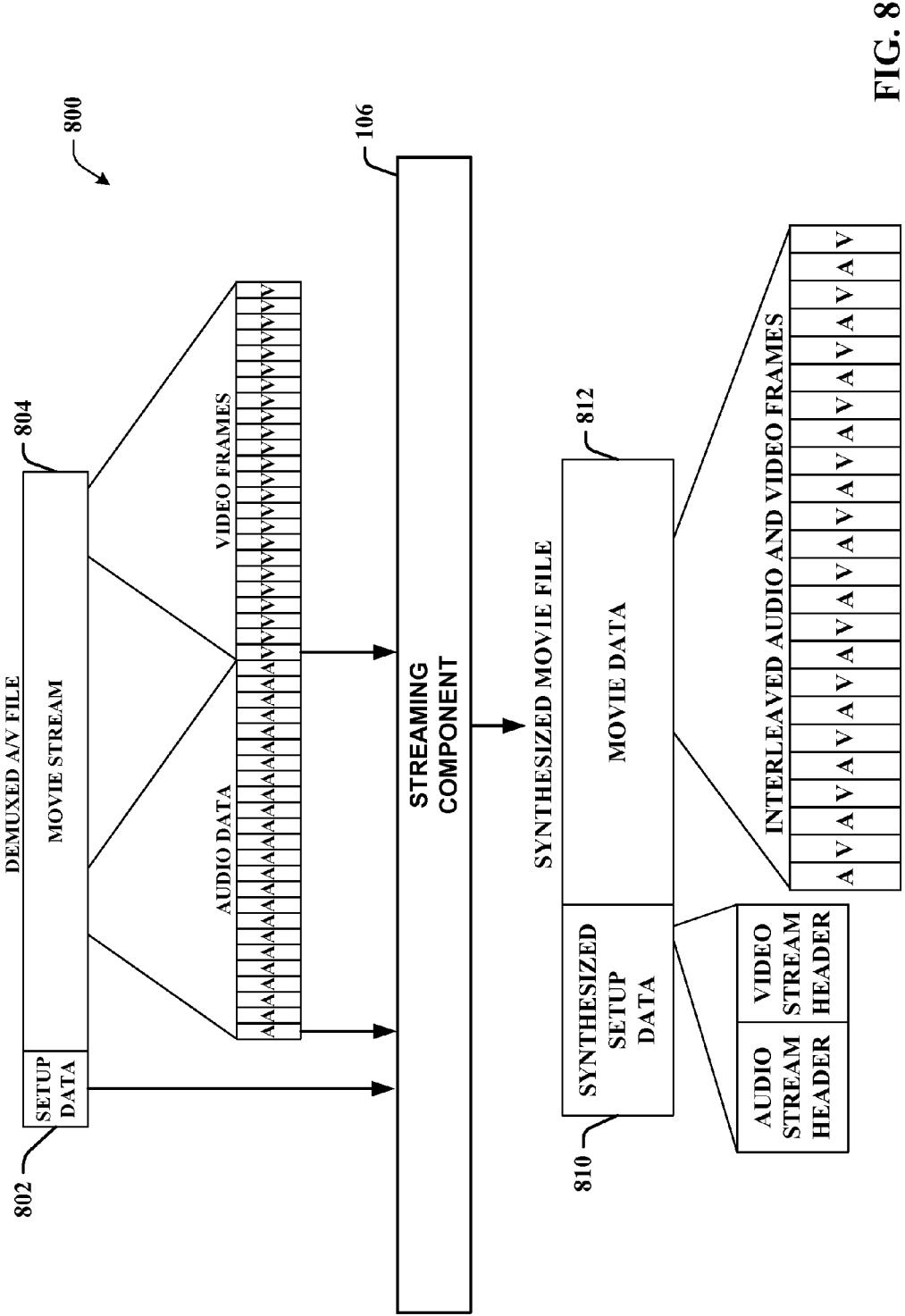

FIG. 8 illustrates an example system 800 for adaptive streaming for legacy media frameworks in accordance with various aspects described in this disclosure. The system 800 includes a streaming component 106. As discussed, the streaming component 106 facilitates processing of streaming media by a legacy media framework (e.g., legacy media framework 104) based on a set of streaming criteria. The set of streaming criteria can include but is not limited to a media file specification, and/or a format of streaming media that the legacy media framework is adapted to process. In addition, the set of streaming criteria can include, or be associated with, a set of header criteria. For example, in one implementation, the set of streaming criteria defines, details, or otherwise specifies a format of streaming video that includes combined audio and video streams, and a format for a set of header data that includes combined header data for the audio and video streams.

In one implementation, a media source (e.g., a media source 108) provides a de-multiplexed stream for audio and video data (demuxed stream 804) associated with a streaming movie. The streaming component 106 obtains, acquires, or otherwise receives header data 802 associated with the demuxed stream 804. For example, in one embodiment, the header data can be included in a manifest for the demuxed stream 804. The streaming component 106 generates a synthesized set of header data 810 using the received header data 802 based on the set of header criteria. The synthesized set of header data 710 includes combined data regarding audio data and video data included in the demuxed stream 804.

In addition, the streaming component 106 acquires data from the demuxed stream 804. For example, in one embodiment, the streaming component 106 can acquire the data based on information included in the manifest. The information included in the manifest can include but is not limited to information regarding locations, sizes, and/or key frames for the demuxed stream 804. The streaming component 106 interleaves audio data and video frames from the demuxed stream 804 based at least in part on the set of streaming criteria, and generates a synthesized set of movie data 812 (e.g., streaming video). The synthesized set of movie data 812 can be provided to the legacy media framework (discussed in greater detail with reference to FIGS. 1 and 2). For instance, the legacy media framework may be adapted to process the synthesized set of header data 810, and the synthesized movie data 812. As an additional or alternative example, in one implementation, the streaming component 106 provides the respective sets of data (e.g., chunks) to the legacy media framework without interleaving the respective the sets of data.

Figure 9:
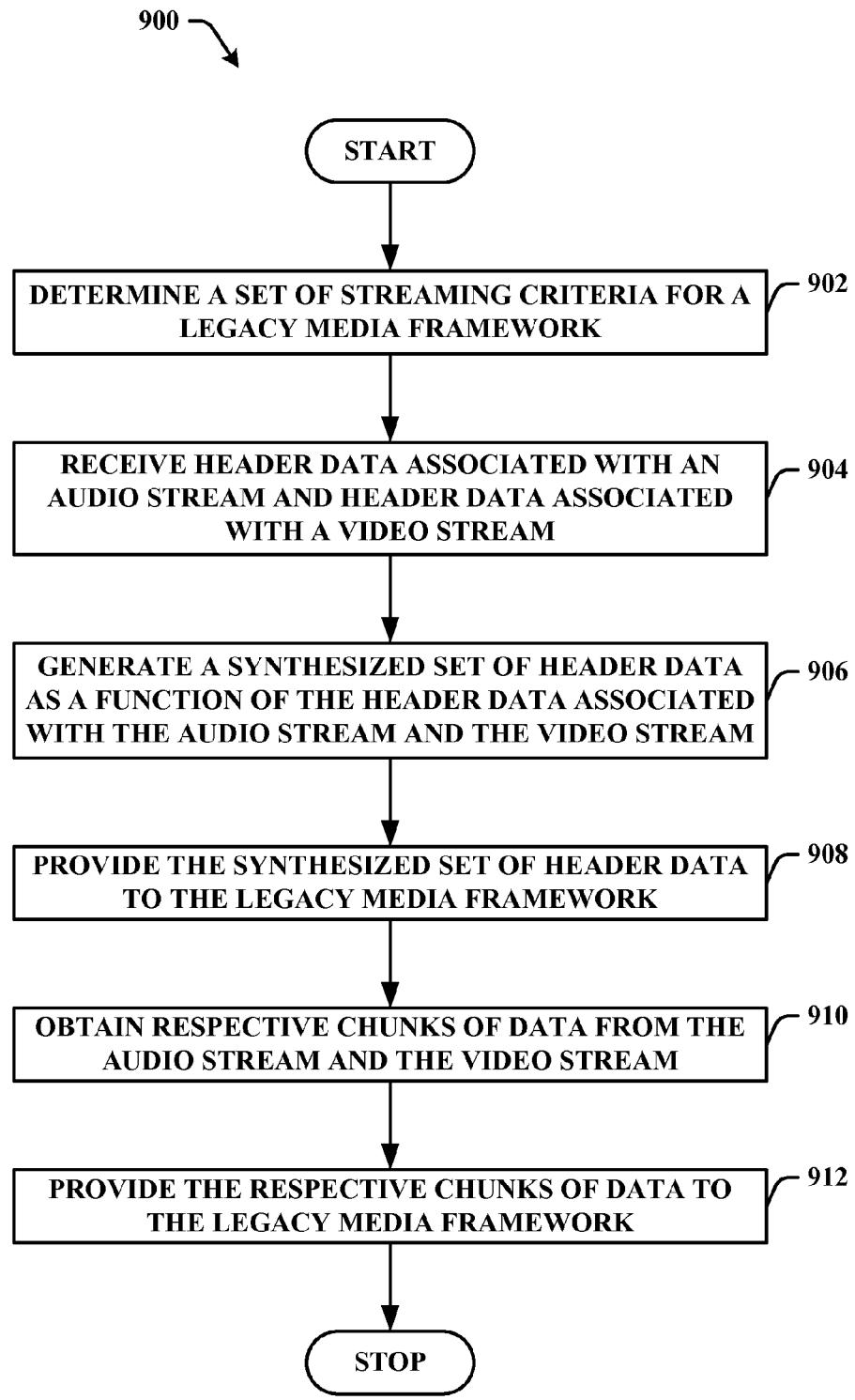
FIGS. 9-10 are example flow diagrams of respective methods for adaptive streaming for legacy media frameworks in accordance with various aspects described herein.
Figure 10:
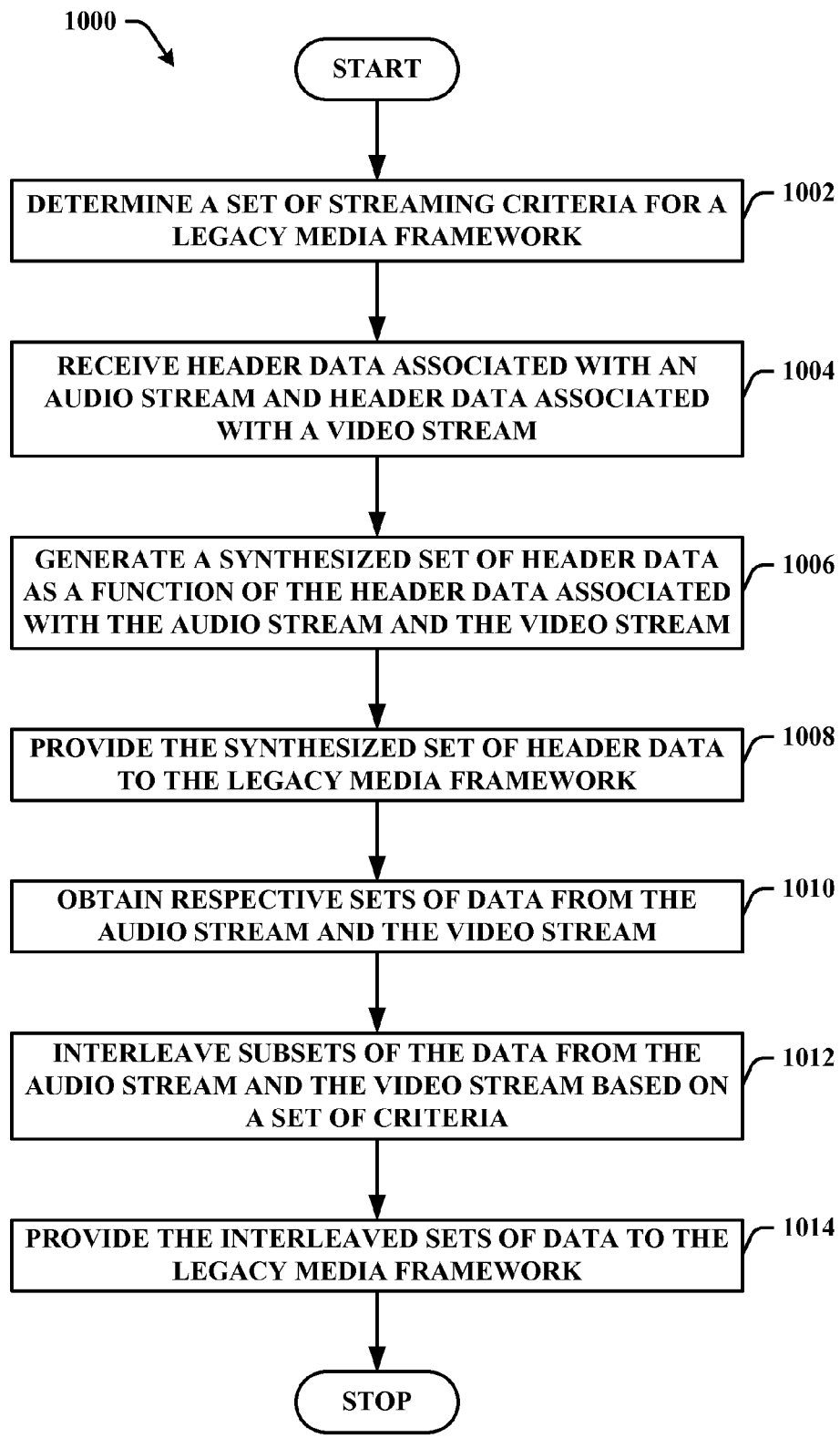

Non-Limiting Examples of Methods for Adaptive Streaming for Legacy Media Frameworks FIGS. 9-10 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 9, illustrated is an example methodology 900 for adaptive streaming for legacy media frameworks in accordance with various aspects described in this disclosure. At reference numeral 902, a set of streaming criteria and/or an associated set of header criteria for a legacy media framework is determined (e.g., using the detection component 202). The set of streaming criteria can include but is not limited to a media file specification, and/or a format for media that the legacy media framework is adapted to process. For example, in one implementation, it is determined that the legacy media framework is adapted to process streaming video having combined audio and video streams.

At reference numeral 904, header data associated with an audio stream for streaming video is received, and header data associated with a video stream for the streaming video is received (e.g., using the reception component 204). For example, in one implementation, a first set of header data associated with the audio stream is received, and a second set of header data associated with the video stream is received. As discussed, the first set of header data and/or second set of header data can be received from a media source including, for example, a content server using hypertext transfer protocol (HTTP). The header data associated with the audio stream and the header data associated with the video stream can be included in respective manifests for the audio stream and/or the video stream.

At reference numeral 906, a synthesized set of header data is generated, based on the set of header criteria, using the header data associated with the audio stream and the header data associated with the video stream (e.g., using the parsing component 206). The set of header criteria can include but is not limited to formats or structures of headers associated with media that the legacy framework is adapted to process. At reference numeral 908, the synthesized set of header data is provided to the legacy media framework (e.g., using the header component 214).

At reference numeral 910, respective chunks of data are obtained from the audio stream and the video stream (e.g., using the download component 208). For example, in one implementation, the respective chunks of data can be obtained based at least in part on information included in the respective manifests. The information included in the manifests includes but is not limited to information regarding locations, sizes, and/or key frames for respective chunks. The chunks may have been encoded at multiple bitrates and may be of various sizes. At reference numeral 912, the respective chunks of data are provided to the legacy media framework based on the set of streaming criteria (e.g. using the adaptation component 210). For example, in one implementation, the respective chunks of data from the audio stream and the video stream are provided, alternately, to the legacy media framework based on the set of streaming criteria.

In addition, mechanisms or data that distinguish streams from one another are updated or modified based on the set of streaming criteria (e.g., using the update component 212). For example, in one implementation, a Stream ID associated with the audio stream and/or video stream is updated based on the set of streaming criteria. As discussed, aspects of the innovation are not limited to a particular quantity of streams for video data and/or audio data. For example, in one implementation, respective chunks of data from a set Y of streams for an audio file or audio data associated with streaming video, and a set X of streams for a video file or video data associated with the streaming video, where X and Y are integers, can be provided to the legacy media framework based on the set of streaming criteria. As an additional or alternative example, in one implementation, respective chunks of data from a single demuxed stream for audio data and video data (e.g., demuxed a/v file) can be provided to the legacy media framework based on the set of streaming criteria.

Turning to FIG. 10, illustrated is an example methodology 1000 for adaptive streaming for legacy media frameworks in accordance with various aspects described in this disclosure. At reference numeral 1002, a set of streaming criteria and/or an associated set of header criteria for a legacy media framework is determined (e.g., using the detection component 202). The set of streaming criteria can include but is not limited to a media file specification, and/or a format for media that the legacy media framework is adapted to process. For example, in one implementation, it is determined that the legacy media framework is adapted to process streaming video having combined audio and video streams.

At reference numeral 1004, header data associated with an audio stream for streaming video is received, and header data associated with a video stream for the streaming video is received (e.g., using the reception component 204). For example, in one implementation, a first set of header data associated with the audio stream is received, and a second set of header data associated with the video stream is received. For instance, the first set of header data and/or second set of header data can be received from a media source (e.g., media source 108) including, for example, a content server. The header data associated with the audio stream and the header data associated with the video stream can be included in respective manifests for the audio stream and/or the video stream.

At reference numeral 1006, a synthesized set of header data is generated, based on the set of header criteria, using the header data associated with the audio stream and the header data associated with the video stream (e.g., using the parsing component 206). The set of header criteria can include but is not limited to formats or structures of sets of header data (headers) associated with media that the legacy framework is adapted to process. At reference numeral 1008, the synthesized set of header data is provided to the legacy media framework (e.g., using the header component 214).

At reference numeral 1010, respective sets of data are obtained from the audio stream and the video stream (e.g., using the download component 208). For example, in one implementation, the respective sets of data can be obtained based at least in part on information included in the respective manifests. The information included in the manifests includes but is not limited to information regarding locations, sizes, and/or key frames for respective chunks.

At reference numeral 1012, respective subsets of the data from the audio stream and the video stream are interleaved based on the streaming criteria (e.g., using the mux component 216) (discussed in greater detail with reference to FIG. 5). At reference numeral 1014, the interleaved data is provided to the legacy media framework (e.g. using the adaptation component 210). Mechanisms or data that distinguish streams from one another are updated or modified based on the set of streaming criteria (e.g., using the update component 212). For example, in one implementation, a Stream ID associated with the audio stream and/or video stream is updated based on the set of streaming criteria. As discussed, aspects of the innovation are not limited to a particular quantity of streams for video data and/or audio data. For example, in one implementation, respective sets of data from a set Y of streams for the audio file or audio data associated with streaming video, and a set X of streams for the video file or video data associated with the streaming video, where X and Y are integers, can be interleaved based on the set of streaming criteria. As an additional or alternative example, in one implementation, respective sets of data from a single demuxed stream for audio data and video data (e.g., demuxed a/v file) can be provided to the legacy media framework based on the set of streaming criteria.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 11:
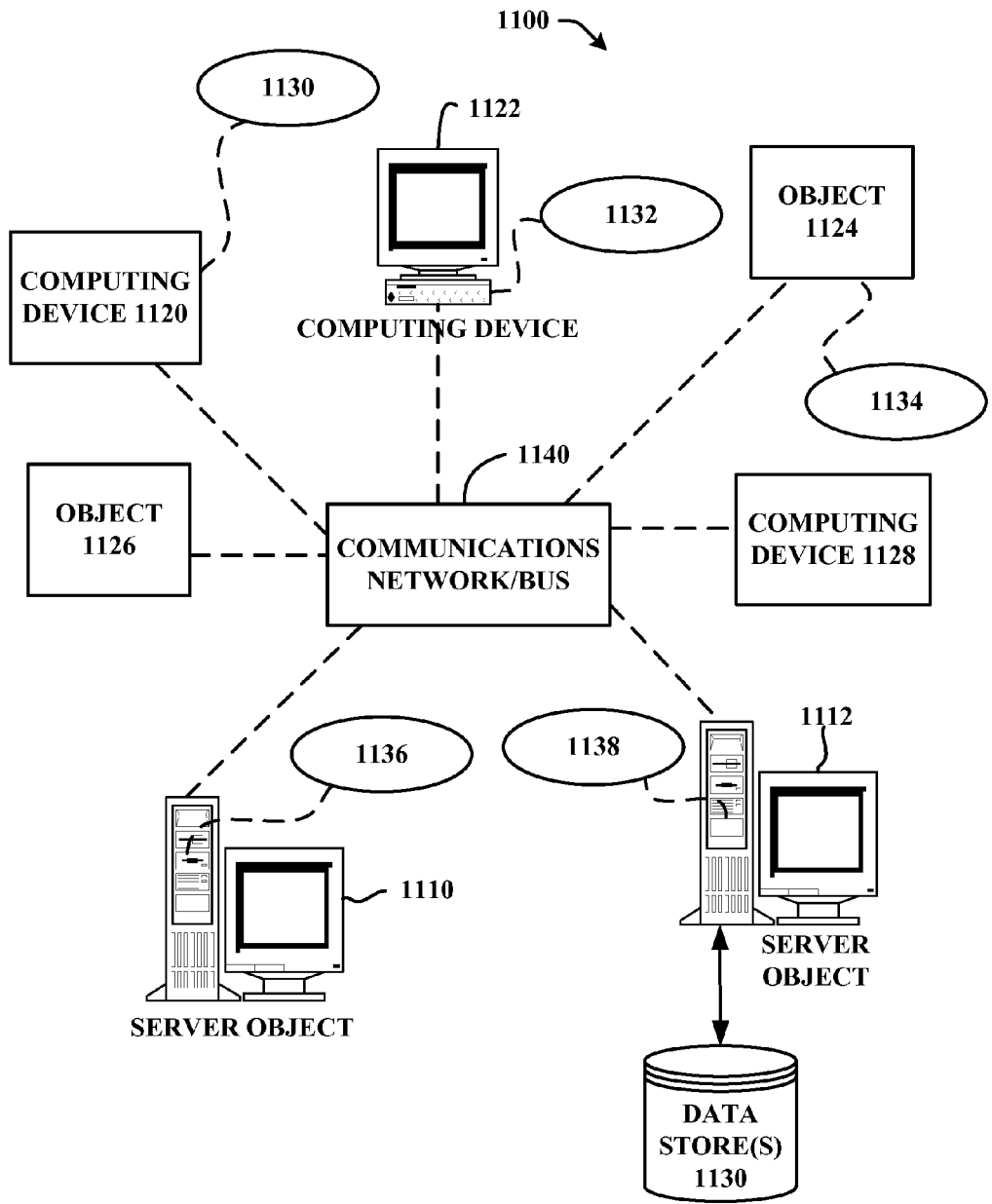
FIG. 11 is a block diagram representing an exemplary non-limiting networked environment in which the various embodiments can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that computing objects 1110, 1112, etc. and computing objects or devices 1120, 1122, 1124, 1126, 1128, etc. may comprise different devices, such as personal data assistants (PDAs), audio/video devices, mobile phones, MP3 players, personal computers, tablets, laptops, etc. It is to be appreciated that the exemplary networked or distributed computing environment in FIG. 11 can be used in connection with implementing one or more of the systems or components shown and described in connection with FIGS. 1-10.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1140 is the Internet, for example, the computing objects 1110, 1112, etc. can be Web servers with which the client computing objects or devices 1120, 1122, 1124, 1126, 1128, etc. communicate via any of a number of known protocols, such as the hypertext transfer protocol (HTTP). Objects 1110, 1112, etc. may also serve as client computing objects or devices 1120, 1122, 1124, 1126, 1128, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 12:
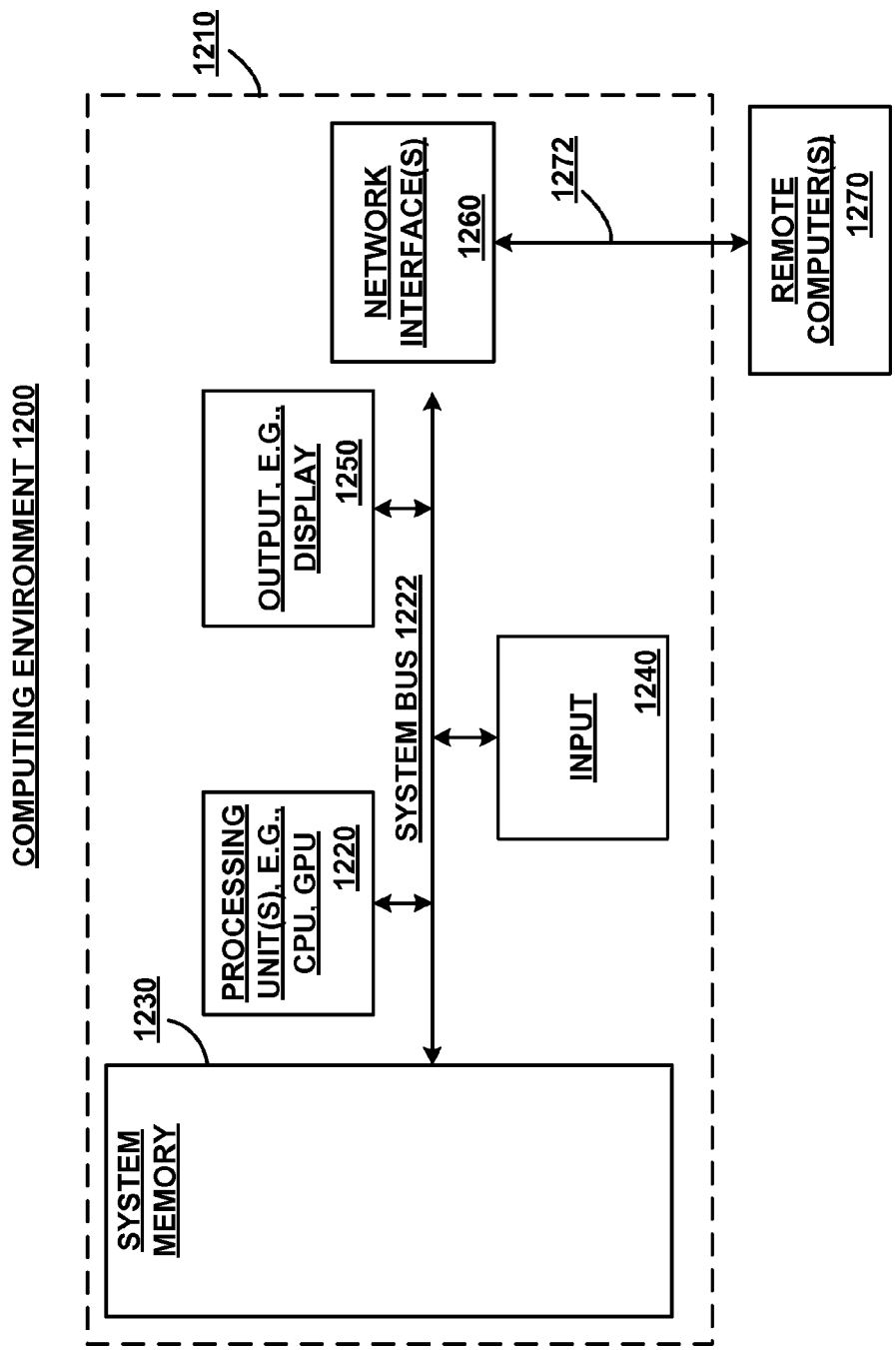
FIG. 12 is a block diagram representing an exemplary non-limiting computing system or operating environment in which the various embodiments may be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing environment 1200 be interpreted as having any dependency or requirement relating to any one or combination of components illustrated in the exemplary operating environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220. It is to be appreciated that the computer 1210 can be used in connection with implementing one or more of the systems or components shown and described in connection with FIGS. 1-2 and 5-8. For instance, the computer 1210 can include a user device 102. In addition, the computer 1210 can include a smart phone, a cell phone, a personal digital assistant (PDA), a tablet, a laptop, a desktop computer, a portable music player, a video game system, an electronic reader (e-reader), a global positioning system (GPS) transceiver, a set-top box, and/or a television.

Computer 1210 includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
    a memory storing computer executable components; and
    a processor configured to execute computer executable components stored in the memory, wherein the computer executable components comprise:
        a reception component that receives a first set of header data associated with an audio stream, and a second set of header data associated with a video stream;

a parsing component that synthesizes, based on a header criterion, a third set of header data using the first set of header data and the second set of header data;

a header component that provides the third set of header data to a media framework;

a download component that acquires a first set of audio stream data and a second set of video stream data;

an adaption component that, based on a streaming criterion, provides subsets of the first set of audio stream data and the second set of video stream data to the media framework, wherein the first set of audio stream data is a first number of streams and the second set of video stream data is a second number of streams, the second number of streams being different from the first number of streams and the second number of streams and the first number of streams being determined based on the streaming criterion, and wherein the first set of audio stream data and the second set of video stream data comprises interleaved subsets of the first set of audio stream data and the second set of video stream data; and a mux component that, based on the streaming criterion, interleaves the subsets of the first set of audio stream data and the second set of video stream data.

2. The system of claim 1, wherein the streaming criterion comprises a media file specification.

3. The system of claim 1, wherein the first set of audio stream data and the second set of video stream data comprises one or more chunks of first set of audio stream data and the second set of video stream data.

4. The system of claim 3, wherein the one or more chunks of data are encoded at different bitrates.

5. The system of claim 1, further comprising an update component that updates a stream identification associated with at least one of the third set of header data, or the provided subsets of the first set of audio stream data and the second set of video stream data.

6. A method, comprising:
receiving, at a device comprising a processor, a first set of header data associated with an audio stream for an audio file and a second set of header data associated with a video stream for a video file;

synthesizing a third set of header data using the first set of header data and the second set of header data based on a header criterion;

providing the third set of header data to a media framework included in the device, wherein the media framework is a legacy media framework that processes audio data interleaved with video data;

obtaining a first set of audio stream data and a second set of video stream data;

interleaving subsets of the first set of audio stream data and the second set of video stream data based on the streaming criterion;

providing the interleaved subsets of the first set of audio stream data and the second set of video stream data to the media framework; and modifying a stream identification associated with at least one of the third set of header data or the interleaved subsets of the first set of audio stream data and the second set of video stream data, wherein the modifying the stream identification comprises modifying the stream identification from a first stream identifier to a second stream identifier, wherein the second stream identifier is formatted to be identifiable to the legacy media framework.

7. The method of claim 6, wherein the obtaining respective sets of data from the audio stream and the video stream comprises obtaining respective chunks of the first set of audio stream data and the second set of video stream data.

8. The method of claim 7, wherein the obtaining respective chunks comprises obtaining respective chunks encoded at two or more different bitrates.

9. The method of claim 6, wherein the obtaining the first set of audio stream data and the second set of video stream data comprises obtaining the first set of audio stream data and a second set of video stream data using hypertext transfer protocol.

10. The method of claim 6, further comprising receiving another set of header data associated with at least one other stream for at least one of the audio file or the video file.

11. The method of claim 10, wherein the synthesizing the third set of header data comprises synthesizing the third set of header data using the first set of header data, the second set of header, and the another set of header data based on the header criterion.

12. A method, comprising:
receiving, at a client device comprising a processor, at least one set of audio header data associated with a set of audio streams for an audio file and at least one set of video header data associated with a set of video streams for a video file;

generating, based on a header criterion, a synthesized set of header data using the at least one set of audio header data and the at least one set of video header data;

providing the synthesized set of header data to a media framework;

obtaining a first set of audio stream data from the set of audio streams and a first set of video stream data from the set of video streams; and providing, based on a streaming criterion, the first set of audio stream data and the second set of video stream data to the media framework, wherein the first set of audio stream data is a first number of streams and the second set of video stream data is a second number of streams, the second number of streams being different from the first number of streams and the second number of streams and the first number of streams being determined based on the streaming criterion, wherein the providing the first set of audio stream data and the second set of video stream data to the media framework comprises interleaving subsets of the first set of audio stream data and the second set of video stream data based on the streaming criterion.

13. The method of claim 12, wherein the obtaining first set of audio stream data and the second set of video stream comprises obtaining respective chunks of data from the set of audio streams and the set of video streams.

14. The method of claim 12, wherein the providing the first set of audio stream data and the second set of video stream data to the media framework comprises interleaving subsets of the first set of audio stream data and the second set of video stream data based on the streaming criterion.

15. A method, comprising:
receiving, at a device comprising a processor, at least one set of header data associated with a demuxed stream;

generating, based on a header criterion, a synthesized set of header data using the at least one set of header data;

providing the synthesized set of header data to a media framework;

obtaining respective sets of audio data and video data from the demuxed stream; and providing, based on a streaming criterion, the respective sets of the audio data and the video data to the media framework, wherein the respective sets of the audio data and the video data comprise a first set of audio stream data having a first number of streams and a second set of video stream data having a second number of streams, the second number of streams being different from the first number of streams and the second number of streams and the first number of streams being identified from the streaming criterion, wherein the providing the sets of audio data and the video data to the media framework comprises interleaving subsets of the sets of audio data and the sets of video data based on the streaming criterion.

16. The system of claim 1, wherein the media framework is a legacy media framework unable to process the first set of audio data and the second set of video data and able to process combination audiovisual data.

17. The system of claim 16, wherein the streaming criterion comprises at least one of a media file specification that the legacy media framework is adapted to process or a format that the legacy media framework is adapted to process.

\* \* \* \* \*